(12) United States Patent
Chu

(10) Patent No.: US 9,233,596 B2
(45) Date of Patent: Jan. 12, 2016

(54) AUXILIARY AIR CONDITIONING DEVICE FOR VEHICLE

(71) Applicant: Henry C. Chu, Orange, CA (US)

(72) Inventor: Henry C. Chu, Orange, CA (US)

( * ) Notice: Subject to any disclaimer, the term of this patent is extended or adjusted under 35 U.S.C. 154(b) by 153 days.

(21) Appl. No.: 14/070,726

(22) Filed: Nov. 4, 2013

(65) Prior Publication Data

US 2015/0121947 A1    May 7, 2015

(51) Int. Cl.
*B60H 1/32*    (2006.01)

(52) U.S. Cl.
CPC .............. *B60H 1/3204* (2013.01); *B60H 1/323* (2013.01); *B60H 2001/3292* (2013.01)

(58) Field of Classification Search
CPC .......... B60H 1/00; B60H 1/3204; B60H 1/32; B60H 1/271; B60H 1/00357; B60H 1/00385; B60H 1/00421
USPC ................................. 62/236, 243, 244, 323.3
See application file for complete search history.

(56) References Cited

U.S. PATENT DOCUMENTS

| | | | |
|---|---|---|---|
| 3,719,058 A * | 3/1973 | Waygood ........................ | 62/200 |
| 4,135,368 A | 1/1979 | Mohr et al. | |
| 4,448,034 A | 5/1984 | Shimada et al. | |
| 5,023,539 A * | 6/1991 | Miller et al. ..................... | 322/28 |
| 5,102,041 A | 4/1992 | Fujiki et al. | |
| 5,986,416 A * | 11/1999 | Dubois ......................... | 318/139 |
| 6,266,967 B1 * | 7/2001 | Honda ............................. | 62/193 |
| 6,367,270 B2 | 4/2002 | Niimi et al. | |
| 6,655,163 B1 * | 12/2003 | Scherer et al. .................. | 62/180 |
| 6,758,054 B2 * | 7/2004 | Zheng et al. .................... | 62/199 |
| 7,028,496 B2 | 4/2006 | Komatsu | |
| 7,259,469 B2 * | 8/2007 | Brummett et al. .......... | 290/40 C |
| 7,743,627 B2 | 6/2010 | Eisenhour | |
| 8,118,087 B2 | 2/2012 | Saida et al. | |
| 2005/0035657 A1 * | 2/2005 | Brummett et al. ........... | 307/10.1 |
| 2007/0131408 A1 * | 6/2007 | Zeigler et al. ................. | 165/240 |
| 2009/0000324 A1 * | 1/2009 | Cheng .......................... | 62/235.1 |
| 2009/0025405 A1 * | 1/2009 | Yanik .............................. | 62/117 |
| 2011/0083919 A1 * | 4/2011 | Kshatriya .................. | 180/65.26 |
| 2011/0265506 A1 * | 11/2011 | Alston ......................... | 62/228.3 |
| 2012/0200263 A1 * | 8/2012 | Masuda ........................ | 320/130 |
| 2012/0234036 A1 * | 9/2012 | Yanik .............................. | 62/434 |
| 2012/0318014 A1 * | 12/2012 | Huff et al. .................... | 62/228.1 |

* cited by examiner

*Primary Examiner* — Mohammad M Ali

(74) *Attorney, Agent, or Firm* — Charles E. Baxley

(57) ABSTRACT

A vehicle includes a primary air conditioning device and an auxiliary air conditioning device each having a condenser, a receiver drier, an evaporator, and an expansion valve, an electrical air conditioning compressor coupled to the primary and the auxiliary air conditioning devices for operating the primary and the auxiliary air conditioning devices, and an alternator coupled to the electrical air conditioning compressor for energizing the electrical air conditioning compressor to operate the primary and the auxiliary air conditioning devices, and for allowing the auxiliary air conditioning device to be actuated to supply the cooling air to cool the vehicle even when the engine of the vehicle is shut off.

4 Claims, 2 Drawing Sheets

AUXILIARY AIR CONDITIONING DEVICE FOR VEHICLE

BACKGROUND OF THE INVENTION

1. Field of the Invention

The present invention relates to an automotive vehicle, and more particularly to an automotive vehicle including an auxiliary air conditioning system or device or apparatus in addition to a primary air conditioning system or device or apparatus for providing or supplying a cooling air to cool the cabinet or the interior of the vehicle when the engine of the vehicle is shut off, without using or consuming the electric power or energy of the main engine starting battery that is required to be provided for starting or re-starting the engine.

2. Description of the Prior Art

Typical automotive vehicles comprise air conditioning system or device or apparatus for providing or supplying a cooling air to cool the cabinet or the interior of the vehicle, and normally comprise a mechanical air conditioning compressor coupled to an engine of the vehicle for being rotated or driven by the engine of the vehicle and for providing or supplying a cooling air to cool the cabinet or the interior of the vehicle and for allowing the drivers and the passengers to stay in the vehicles, particularly during the hot summer days.

For example, U.S. Pat. No. 4,135,368 to Mohr et al., U.S. Pat. No. 4,448,034 to Shimada et al., U.S. Pat. No. 5,102,041 to Fujiki et al., U.S. Pat. No. 6,367,270 to Niimi et al., U.S. Pat. No. 7,028,496 to Komatsu, U.S. Pat. No. 7,743,627 to Eisenhour, and U.S. Pat. No. 8,118,087 to Saida et al. disclose several of the typical automotive vehicles each also comprising air conditioning system or device or apparatus including a mechanical air conditioning compressor coupled to an engine of the vehicle for being rotated or driven by the engine of the vehicle and for providing or supplying a cooling air to cool the cabinet or the interior of the vehicle, and a main engine starting battery disposed in the engine room for supplying the electric energy to energize the electrical parts or elements of the vehicle. Normally, a 12 VDC main engine starting battery is required to be provided for a regular vehicle, and a 24 VDC main engine starting battery is required to be provided for a heavy truck for starting or re-starting the engine of the vehicle.

However, the main engine starting battery may not be consumed or used to energize the other electrical parts or elements of the vehicle, otherwise, the main engine starting battery may not provide and supply enough electric power or energy to re-start the engine of the vehicle, and the mechanical air conditioning compressor may not be powered or actuated or operated by the main engine starting battery, and should be coupled to the engine of the vehicle and should be rotated or driven by the engine of the vehicle in order to provide or supply the cooling air to cool the cabinet or the interior of the vehicle. When the engine of the vehicle is shut off, the mechanical air conditioning compressor may no longer be actuated or operated by the engine of the vehicle and may not provide or supply the cooling air to cool the cabinet or the interior of the vehicle.

In some conditions, such as in a traffic jam, most of the automotive vehicles may not be moved and should be wait in line, or may be parked on the road for a long time, but the temperature in the cabinet or in the interior of the vehicle may be great or may be at a high value that the drivers and the passengers may feel uncomfortable, such that the engines of the vehicles should be kept actuated or operated to rotate or drive the mechanical air conditioning compressor and to provide or supply the cooling air to cool the cabinet or the interior of the vehicle as long as the drivers and the passengers are seated within the vehicles, and such that the engines of the vehicles should continuously consume the gasoline and may waste a lot of precious energy. In addition, the running or the actuation or the operation of the vehicles may normally generate a great amount of carbon dioxide and some toxic gases which may seriously pollute our environment.

The present invention has arisen to mitigate and/or obviate the afore-described disadvantages of the conventional air conditioning systems for the vehicles.

SUMMARY OF THE INVENTION

The primary objective of the present invention is to provide an automotive vehicle including an auxiliary air conditioning system or device or apparatus in addition to a primary air conditioning system or device or apparatus for providing or supplying a cooling air to cool the cabinet or the interior of the vehicle and for allowing the drivers and the passengers to stay in the vehicles, particularly during the hot summer days even when the engine of the vehicle is shut off, without using or consuming the electric power or energy of the main engine starting battery that is required to be provided for starting or re-starting the engine, and it helps saving the fuel consumption and saving the environment with more clean air, and help reducing exhausts emission and less air pollution.

In accordance with one aspect of the invention, there is provided a vehicle comprising a primary air conditioning device including a condenser, a receiver drier, an evaporator, and an expansion valve, an auxiliary air conditioning device including a condenser, a receiver drier, an evaporator, and an expansion valve, an electrical air conditioning compressor coupled to the primary air conditioning device and the auxiliary air conditioning device for operating the primary air conditioning device and the auxiliary air conditioning device, and an alternator coupled to the electrical air conditioning compressor for energizing the electrical air conditioning compressor to operate the primary air conditioning device and the auxiliary air conditioning device, and for allowing the auxiliary air conditioning device to be actuated or operated to generate and to supply the cooling air to cool the cabinet or the interior of the vehicle and for allowing the drivers and the passengers to stay in the vehicles, particularly during the hot summer days even when the engine of the vehicle is shut off or switched off.

A spare or auxiliary battery may further be provided and coupled to the alternator for storing an electric power or energy generated by the alternator, and coupled to the electrical air conditioning compressor for energizing the electrical air conditioning compressor even when the engine of the vehicle is shut off or switched off.

The battery may be selected from a high voltage battery, for example, the high voltage battery may include a relatively higher voltage ranged between 48 and 96 DC voltages, or ranged between 48 and 72 DC voltages or the like for providing or supplying enough electric power or energy to energize the electrical air conditioning compressor even when the engine of the vehicle is shut off or switched off.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
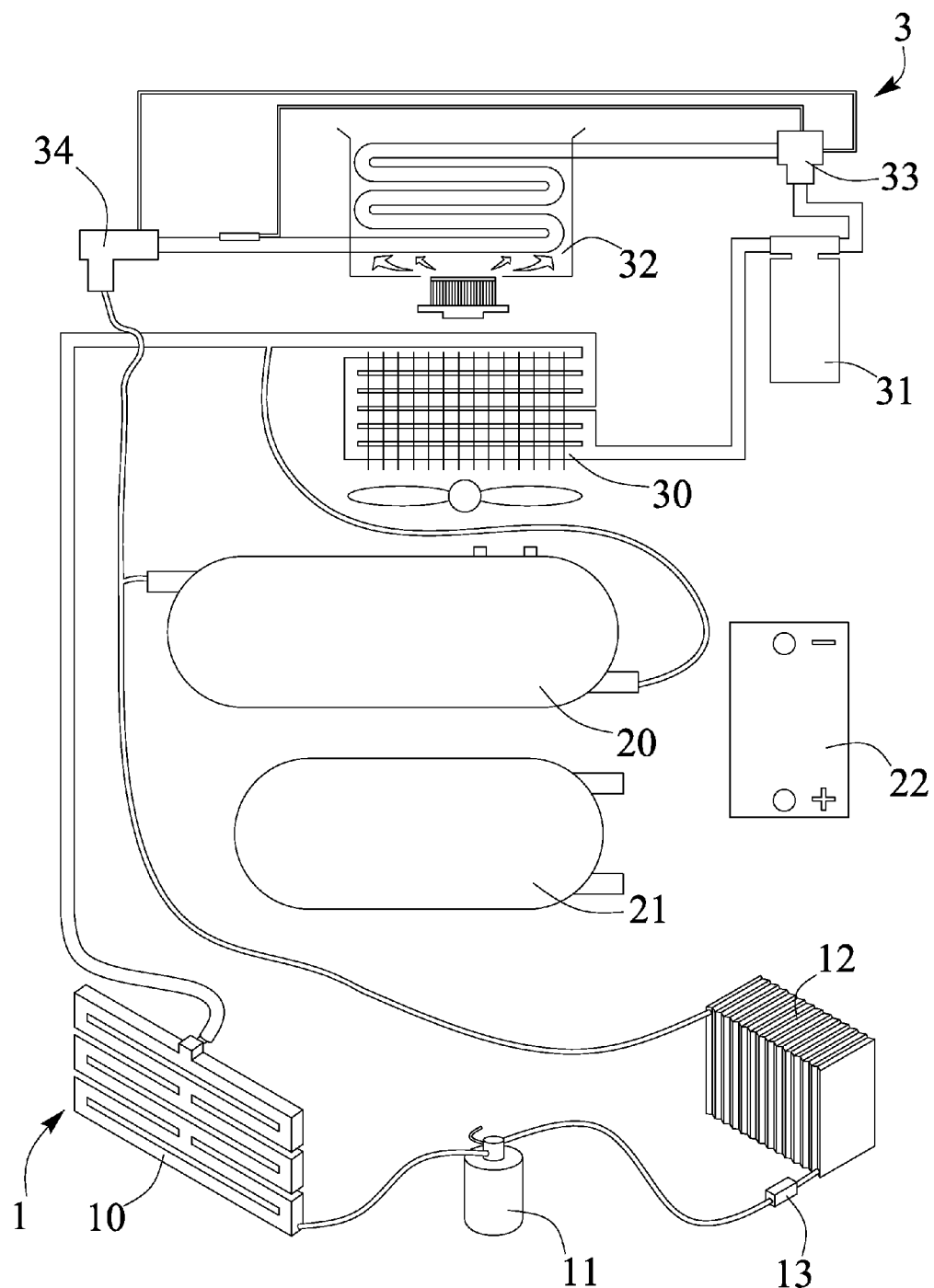
FIG. 1 is a plan schematic view of a vehicle including an auxiliary air conditioning system or device or apparatus in addition to a primary air conditioning system or device or apparatus in accordance with the present invention.

Referring to the drawings, and initially to FIG. 1, a vehicle in accordance with the present invention comprises a primary air conditioning system or device or apparatus 1 including a condenser 10, a receiver drier 11, an evaporator 12, and an expansion valve 13 that are also required to be provided for the conventional air conditioning system, in which the condenser 10 and the receiver drier 11 and the evaporator 12 and the expansion valve 13 for the conventional air conditioning systems are typical and have been disclosed in the cited arts and will not be described in further details. Without, and instead of the conventional mechanical air conditioning compressor that is required to be provided and rotated or driven by the engine of the vehicle, an electrical air conditioning compressor 20 is provided and coupled to the primary air conditioning device 1 for operating the primary air conditioning device 1 and/or for supplying a cooling agent through the primary air conditioning device 1.

Figure 2:
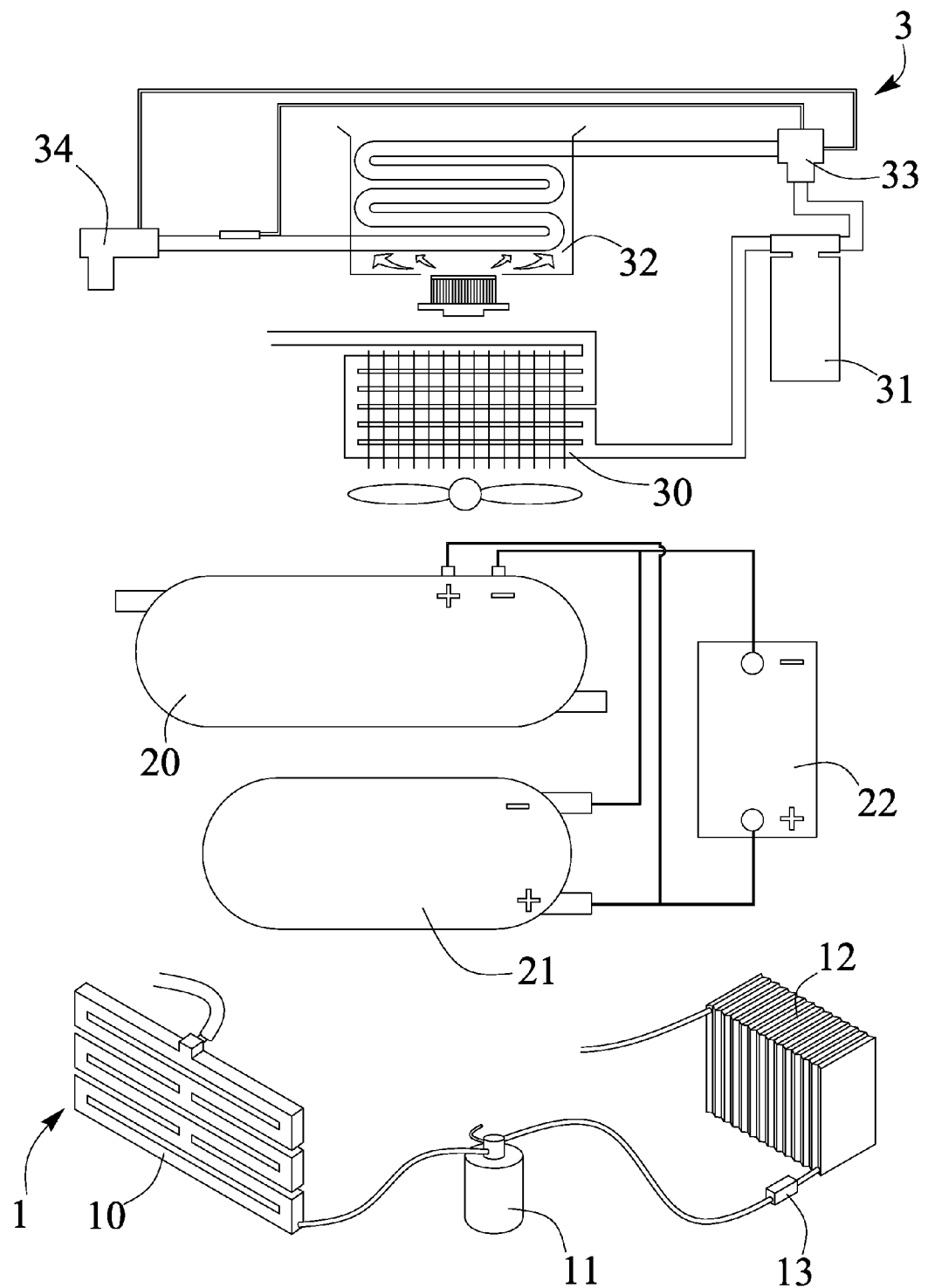
FIG. 2 is another plan schematic view illustrating the electric circuit for the air conditioning devices of the vehicle.

A high voltage alternator 21 is provided and disposed or engaged in the engine room (not illustrated) and disposed or attached or mounted or secured on the location or position where the conventional mechanical air conditioning compressor is previously located and mounted, and the alternator 21 is coupled to the engine of the vehicle (not illustrated) for being rotated or driven by the engine of the vehicle in order to generate an electric energy and to energize the electrical parts or elements of the vehicle. An additional or individual or independent battery 22, other than the 12 VDC main engine starting battery for the regular vehicle and the 24 VDC main engine starting battery for the heavy truck, is further provided and disposed in the engine room and coupled to the alternator 21 and/or the electrical air conditioning compressor 20 (FIG. 2) for storing the electric energy that is generated by the alternator 21.

The battery 22 is selected from a high voltage battery 22 having a voltage greater than the 24 VDC battery, for example, the voltage of the battery 22 may be selected from 36 VDC or greater, such as a 48-72 or 48-96 DC voltage battery 22 or the like for storing the electric energy of a greater voltage and for providing and supplying the electric energy to energize the electrical parts or elements of the vehicle, such as the electrical air conditioning compressor 20. A spare or auxiliary or individual or independent air conditioning system or device or apparatus 3 is further provided and coupled to the electrical air conditioning compressor 20 for being actuated or operated or rotated or driven by the electrical air conditioning compressor 20 and for generating and supplying a cooling air to cool the cabinet or the interior of the vehicle selectively, or when required. The auxiliary air conditioning device 3 also includes a condenser 30, a receiver drier 31, an evaporator 32, an expansion valve 33 and/or an evaporator pressure regulator 34 for generating the cooling air.

In operation, as shown in FIG. 1, when the engine of the vehicle is switched on and when the alternator 21 is rotated or driven by the engine of the vehicle, the alternator 21 may generate an electric energy to energize the electrical parts or elements of the vehicle, including at least the electrical air conditioning compressor 20 which may be actuated or operated to supply the cooling agent through the primary air conditioning device 1 and/or the auxiliary air conditioning device 3 in order to supply the cooling air to cool the cabinet or the interior of the vehicle when the engine of the vehicle is switched on. When the engine of the vehicle is shut off, the alternator 21 is no longer rotated or driven by the engine of the vehicle (FIG. 2), but the electrical air conditioning compressor 20 may still be actuated or operated by the battery 22 to supply the cooling agent through the auxiliary air conditioning device 3 and to generate and supply the cooling air to cool the cabinet or the interior of the vehicle even when the engine of the vehicle is switched off or shut off.

It is to be noted that the alternator 21 may be rotated or driven by the engine of the vehicle in order to charge the battery 22 while engine is running, and the electrical air conditioning compressor 20 may be actuated or operated by the battery 22 to supply the cooling agent through the auxiliary air conditioning device 3 and to generate and supply the cooling air to cool the cabinet or the interior of the vehicle when the engine of the vehicle is switched off or shut off. The 12 VDC main engine starting battery for the regular vehicle and the 24 VDC main engine starting battery for the heavy truck are not required to be provided or used to energize the electrical air conditioning compressor 20 and will not be consumed and drained down and affected by the electrical air conditioning compressor 20 while the engine of the vehicle is switched off or shut off. It will help saving the fuel consumption and saving the environment with more clean air, and help reducing exhausts emission and less air pollution.

For example, the conventional mechanical air conditioning compressor may approximately consume 5%~10% of total engine load, but the alternator 21 consumes only approximately 2%~3% of total engine load. In addition, the vehicles, particularly the heavy duty trucks are not required to be kept idling, and the auxiliary air conditioning device 3 may still be actuated or operated by the electrical air conditioning compressor 20 and the battery 22 while the engine of the vehicle is switched off or shut off such that more fuel consumption and costs of gas and fuel may be saved. It is further to be noted that, in some places, the vehicles may not be kept idling, and it will be difficult for the drivers and the passengers to stay in the vehicles, particularly during the hot summer days. Furthermore, the content for the higher voltage, more than 24 volts, the electrical system will be suitably decreased or reduced the weight and size or dimension of the air conditioning system, and the current flow and the resistance will be lowered or decreased or reduced.

Accordingly, the automotive vehicle in accordance with the present invention includes an auxiliary air conditioning system or device or apparatus in addition to a primary air conditioning system or device or apparatus for providing or supplying a cooling air to cool the cabinet or the interior of the vehicle and for allowing the drivers and the passengers to stay in the vehicle even when the engine of the vehicle is shut off, without using or consuming the electric power or energy of the main engine starting battery that is required to be provided for starting or re-starting the engine, and it helps saving the fuel consumption and saving the environment with more clean air, and help reducing exhausts emission and less air pollution.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A vehicle comprising:
    a primary air conditioning device including a condenser, a receiver drier, an evaporator, and an expansion valve,
    an auxiliary air conditioning device including a condenser, a receiver drier, an evaporator, and an expansion valve,
    an electrical air conditioning compressor coupled to said primary air conditioning device and said auxiliary air conditioning device for operating said primary air conditioning device and said auxiliary air conditioning device,
    an alternator coupled to said electrical air conditioning compressor for energizing said electrical air conditioning compressor to operate said primary air conditioning device and said auxiliary air conditioning device, and
    a battery coupled to said alternator for storing an electric energy generated by said alternator, and coupled to said electrical air conditioning compressor for energizing said electrical air conditioning compressor and for operating said auxiliary air conditioning device when said alternator is not operated.

2. The vehicle as claimed in claim 1, wherein said battery is selected from a high voltage battery.

3. The vehicle as claimed in claim 2, wherein said high voltage battery includes a voltage ranged between 48 and 96 DC voltages.

4. The vehicle as claimed in claim 2, wherein said high voltage battery includes a voltage ranged between 48 and 72 DC voltages.

* * * * *